(12) United States Patent
Bickert et al.

(10) Patent No.: US 6,489,918 B2
(45) Date of Patent: Dec. 3, 2002

(54) REAL-TIME (STAP) FILTER FOR A FIXED-TARGET SUPPRESSION

(75) Inventors: Bernhard Bickert, Ulm (DE); Jochen Meyer-Hilberg, Elchingen (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/804,053

(22) Filed: Mar. 13, 2001

(65) Prior Publication Data
US 2002/0033765 A1 Mar. 21, 2002

(30) Foreign Application Priority Data
Mar. 13, 2000 (DE) ......................... 100 12 411

(51) Int. Cl.$^7$ .................. G01S 13/524; G01S 13/44
(52) U.S. Cl. ..................... 342/162; 342/160
(58) Field of Search ............... 342/25, 159, 160, 342/162

(56) References Cited

U.S. PATENT DOCUMENTS

| | | | |
|---|---|---|---|
| H1005 H | * 12/1991 | Gerlach | ............ 342/160 |
| 5,748,143 A | 5/1998 | Melvin, Jr. | |
| 5,907,302 A | 5/1999 | Melvin, Jr. | |

OTHER PUBLICATIONS

Ward, J. "Space–Time Adaptive Processing for Airborne Radar", Space–Time Adaptive Processing (Ref. No. 1998/241), IEE Colloquium on, 1998, pp.: 2/1–2/6.*

Farina, A.; Timmoneri, L. "Real–time STAP techniques", Space–Time Adaptive Processing (Ref. No. 1998/241), IEE Colloquium on, 1998, pp.: 3/1–3/7.*

Richmond, C. D., "The theoretical performance of a class of space–time adaptive detection and training strategies for airborne radar", Signals, Systems and Computers, 1998 Conference record..*

Richardson, P.G., "Space–time adaptive processing for manoeuvring airborne radar", Electronics & Communication Engineerin Journal, vol.: 11 issue: 1, Feb. 1999, pp.: 57–63.*

Jackson D. Bigham, Jr., "A Highly Parallel Signal Processor" IEEE, 1990.

J. H. G. Ender, "The Airborne Experimental Multi–Channel SAR–System AER–II" EUSAR, 1996.

Copy of the International Search Report.

* cited by examiner

*Primary Examiner*—Ian J. Lobo
(74) *Attorney, Agent, or Firm*—Crowell & Moring LLP

(57) ABSTRACT

For optimizing the computing expenditures when using STAP filters in real-time systems, the determination of the filter coefficients and the filtering of radar source data of the distance Doppler matrices $\vec{X}_{left}$ and $\vec{X}_{right}$ of two adjacent reception channels are carried out in the frequency domain. On the basis of $\vec{X}_{left}$ and $\vec{X}_{right}$, a distance Doppler matrix $\vec{Y}_{clutterfree}$ is created, at which the echoes of fixed targets are suppressed and the echoes of moving targets a coherently intensified.

7 Claims, 1 Drawing Sheet

REAL-TIME (STAP) FILTER FOR A FIXED-TARGET SUPPRESSION

BACKGROUND AND SUMMARY OF THE INVENTION

This application claims the priority of Germany priority document 100 12 411.9, filed Mar. 13 2000, the disclosure of which is expressly incorporated by reference herein.

The invention relates to a process for computing the coefficients of a space-time adaptive processing (STAP) filter, and for filtering radar source data of the distance Doppler matrices of two adjacent reception channels by means of space-time adaptive processing.

Radar source data consist of a mixture of signals (such as echoes from moving and stationary targets) and interferences (such as noise). As a rule, when analyzing these radar source data, interferences are to be suppressed so that the signals can be easily detected.

To improve the detection of moving targets (or example, in SAR images), it is necessary to suppress interference signals as well as signals which originate from stationary targets. A suitable process for this purpose is space-time adaptive processing (STAP). In known processes for this purpose, the radar source data are as a rule filtered in the time domain.

It is an object of the invention to compute and implement in a simple manner, within the scope of the STAP processing, the filter coefficients and the filtering of the radar source data of the distance Doppler matrices $\vec{X}_{left}$ and $\vec{X}_{right}$ of two reception channels, so that use of this STAP filter is permitted in real-time systems.

This and other objects and advantages are achieved by the process according to the invention, in which in contrast to conventional STAP filters, computation of the coefficients and the filtering is performed exclusively in the frequency domain. Similar to the 'fast folding', a considerable advantage is therefore obtained with respect to the necessary processor performance.

The theoretical basis of the process according to the invention resides in the proposition that the Doppler frequency and the phase difference are correlated in the case of typical SAR source data, in the signal spectrum of two adjacent channels.

Other objects, advantages and novel features of the present invention will become apparent from the following detailed description of the invention when considered in conjunction with the accompanying drawings.

DETAILED DESCRIPTION OF THE DRAWINGS

Figure 1:
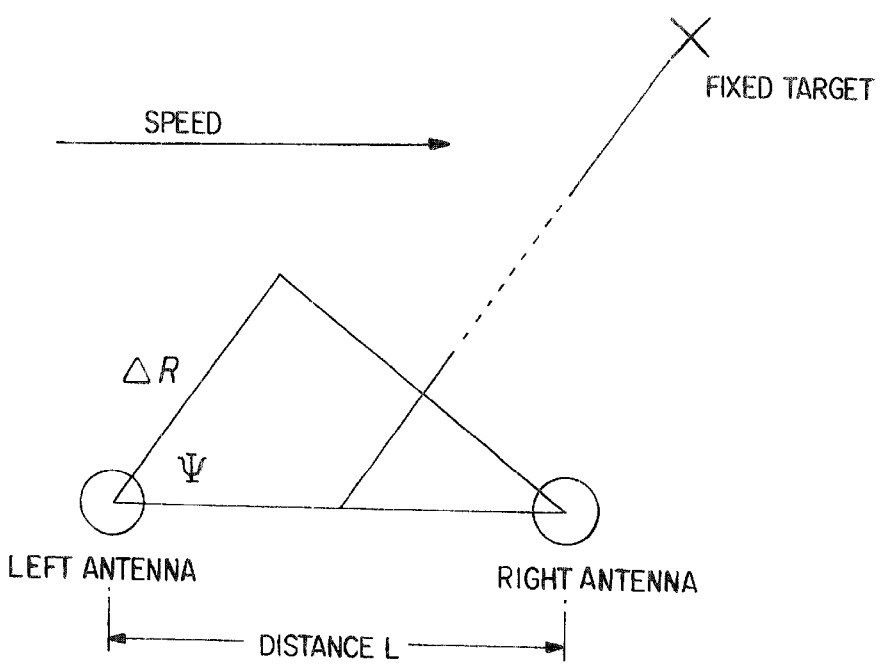
FIG. 1 shows the geometric relationships between two adjacent antennae ('left' channel and 'right' channel) and a fixed target.

It is known that, for the geometrical relationships illustrated in FIG. 1 between two adjacent antennas 1 and 2 and a fixed target 3, the Doppler frequency can be determined according to equation 1 as follows:

$$f_D = \frac{2v}{\lambda}\cos\Psi \qquad \text{Equation 1}$$

wherein v is the speed of the radar scanners; $\lambda$ is the wavelength of the radar signal; and $\psi$ is the azimuth angle at which the target is seen, in which case the target itself does not move.

The following expression can now be used in order to derive a relationship between the Doppler frequency and the phase difference:

$$\cos\Psi = -\frac{\Delta R}{L} \qquad \text{Equation 2}$$

wherein L is the antenna spacing and $\Delta R$ is the range difference between the right and the left signal, from which the phase difference $\Delta\phi$ between the right and the left signal can be determined:

$$\Delta\varphi = -\frac{2\pi \cdot \Delta R}{\lambda} + n \cdot 2\pi \qquad \text{Equation 3}$$

with $n$ so that $-\pi < \Delta\varphi \le \pi$

Placing Equations 1 and 2, with the substitution of $$\left(2 \cdot \frac{\Delta R}{\lambda}\right),$$

in Equation 3 will result in the following:

$$\Delta\varphi = \frac{\pi \cdot L}{v} f_D + n \cdot 2\pi \qquad \text{Equation 4}$$

with $n$ so that $-\pi < \Delta\varphi \le \pi$

However, it should be taken into account here that Equation 4 applies only to the range of the major antenna lobe.

Figure 2:
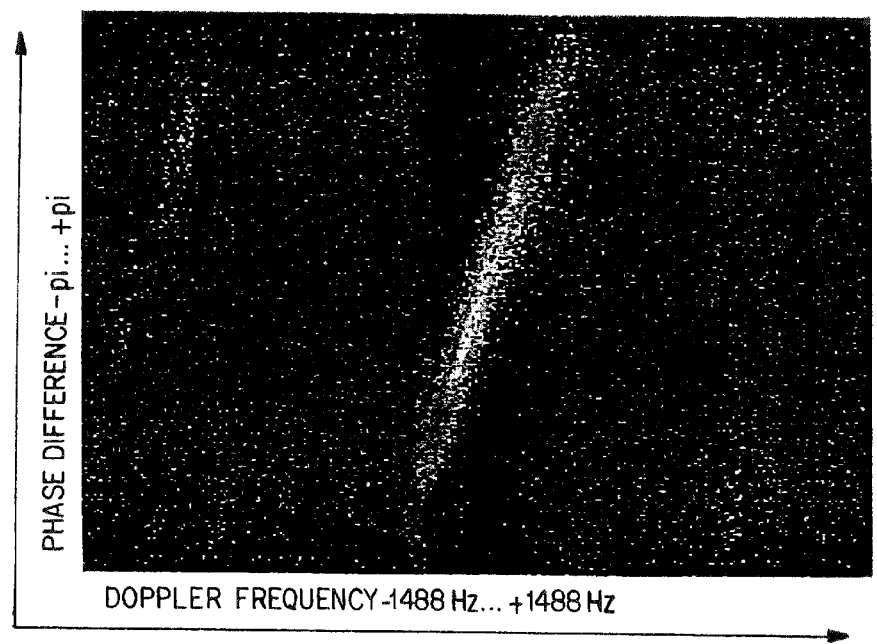
FIG. 2 shows an example of the correlation of the signal spectra of two adjacent channels with respect to the Doppler frequency and the phase difference.

The correlation of the signal spectra of two adjacent channels with respect to the Doppler frequency and the phase difference is illustrated in FIG. 2 as an example of a typical data set. In the center of the graphic presentation defined by $\Delta\phi$ and $f_D$ (which, with respect to its abscissa is proportional to the azimuthal dimension of the major antenna lobe), the linear relationship between the Doppler frequency (resulting from the azimuthal deflection) and the phase difference $\Delta\phi$ is clearly demonstrated.

Within the scope of the process according to the invention, computation of the filter coefficients as well as the filtering of the radar source data in the frequency range can be divided into three steps. In a first step, weighted average values $\overline{\Delta\phi}(l)$ of the phases differences $\Delta\phi(k,l)$ are determined by way of all distance gates k from $\vec{X}_{left}$ and $\vec{X}_{right}$.

In this case, an appropriate selection of n azimuth cells 1 must be made which should be a function of the width of the major antenna lobe. Advantageously, the selection of appropriate azimuth cells 1 is designed such that the selected range is limited to the range to which the linear relationship applies between the Doppler frequency and the phase difference, as illustrated in FIG. 2.

This range is characterized in that the amount of the cross correlation of the antenna characteristic is greater than or equal to a suitable threshold value.

Care should be taken that the performance P(k,l) of the radar source data is used to its best advantage in a suitable manner for weighting the values of $\Delta\phi(k,l)$. Advantageously, the performance P(k,l) can be used for weighting Δφ(k,l) in such a manner that, for each of the N selected columns of $\vec{X}_{left}$ and $\vec{X}_{right}$, the cross correlation is computed and the sum over all correlation values is used when computing the phase difference $\overline{\Delta\phi}(l)$. By a suitable addition or subtraction of a constant to be determined, the values of $\overline{\Delta\phi}(l)$ are to be kept in the range of −Π and +Π. This is to be determined to such an extent that the function of the phase differences $\overline{\Delta\phi}(l)$ rises monotonically in the range of −Π and +Π.

In a second step, the parameters of a straight regression line are determined which approximately describe the correlation between the Doppler frequency and the phase difference. This is achieved by an analysis of the functional relationship of $\overline{\Delta\phi}(l)$. To estimate the parameters of the straight regression line, linear regression for example can be used, in which the sum of the squares of all errors is minimized. As a result, the two parameters of the straight regression line, slope m and offset b, are obtained which in the subsequent process step are considered as the values describing the correlation between the phase difference and the Doppler frequency.

A distinction is to be made between two cases with respect to the actual filtering of the radar source data of the distance Doppler matrices $\vec{X}_{left}$ and $\vec{X}_{right}$. The first case relates to the n azimuth cells or ranges l which, relative to the width of the major lobe, were selected in the first process step. Here, the phase angle rotations of the radar source data in $\vec{X}_{right}$ are corrected with respect to those in $\vec{X}_{left}$ and are used for the formation of $\vec{Y}_{clutterfree}$ according to equation 5:

$$\vec{Y}_{clutterfree}(k,l)=\vec{X}_{left}(k,l)-\vec{X}_{right}(k,l)\cdot e^{-j(m\cdot l+b)} \qquad \text{Equation 5}$$

The second case relates to all other azimuth cells and ranges l. Here, the two matrices $\vec{X}_{left}$ and $\vec{X}_{right}$ are simply coherently added corresponding to Equation 6:

$$\vec{Y}_{clutterfree}(k,l)=\vec{X}_{left}(k,l)+\vec{X}_{right}(k,l) \qquad \text{Equation 6}$$

When the process according to the invention is used, it is advantageously found that moving targets within the major antenna lobe, whose echoes appear, however, outside the major antenna lobe, are coherently intensified. Moving targets in the center of the major antenna lobe are raised in their intensity to up to 6 dB.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for filtering radar source data of distance Doppler matrices $\vec{X}_{left}$ and $\vec{X}_{right}$ of two adjacent reception channels, comprising:
   computing filter coefficients for a space-time adaptive processing filter, in the frequency domain; and
   filtering said radar source date in the frequency domain via said space-time adaptive filter; wherein
   as a result of filtering on the basis of $\vec{X}_{left}$ and $\vec{X}_{right}$, a distance Doppler matrix $\vec{Y}_{clutterfree}$ is created, at which echoes of fixed targets are suppressed and the echoes of moving targets are coherently intensified;
   filtering in the frequency range takes place in three steps, including
   in a first step, weighted average values $\overline{\Delta\phi}(l)$ of phases differences Δφ (k,l) are determined by way of all distance gates k from $\vec{X}_{left}$ and $\vec{X}_{right}$, selection of n suitable azimuth cells l being made as a function of width of a major antenna lobe, wherein performance P(k,l) is to be used for weighting the values of Δφ (k,l) and, by addition or subtraction of the constants to be determined, for obtaining values of $\overline{\Delta\phi}(l)$ in the range of −π and +π;
   in a second step, parameter values for slope m and offset b are determined for a straight regression line which, as the straight compensation line, describes approximately the correlation between the Doppler frequency and the phase difference in $\overline{\Delta\phi}(l)$; and
   in a third step, input signals are filtered in the frequency domain, with a distinction being drawn between two cases, specifically,
   i) within the n azimuth cells or ranges l selected with respect to the width of the major lobe in the first process step, phase angle rotations of the source data in $\vec{X}_{right}$ are corrected with respect to those in $\vec{X}_{left}$ and are used for the formation of $\vec{Y}_{clutterfree}$, according to $$\vec{Y}_{clutterfree}(k,l)=\vec{X}_{left}-\vec{X}_{right}(k,l)\cdot e^{-j(m\cdot l+b)},$$

and
   ii) in the case of all other azimuth cells or ranges l, the two matrices $\vec{X}_{left}$ and $\vec{X}_{right}$ are simply added, according to $$\vec{Y}_{clutterfree}(k,l)=\vec{X}_{left}(k,l)+\vec{X}_{right}(k,l).$$

2. The process according to claim 1, wherein the selection of suitable azimuth cells l is such that they are limited to the range of the major antenna lobe, within which the linear relationship applies between the Doppler frequency and the phase difference.

3. The process according claim 1, wherein the selection of suitable azimuth cells l is such that it is limited to the azimuthal range of the major antenna lobe, within which an extent of cross correlation of the antenna characteristic is greater than or equal to a presettable threshold value.

4. The process according to claim 3, wherein the performance P(k,l) is used for weighting of Δφ (k,l) such that, for each of the n selected columns of $\vec{X}_{left}$ and $\vec{X}_{right}$, the cross correlation is computed, and the sum over all correlation values is used as an entry in $\overline{\Delta\phi}(l)$.

5. The process according to claim 1, wherein as the constant which must be added to or subtracted from the values of $\overline{\Delta\phi}(l)$ in order to keep them in the unambiguous range range of −Π and +Π, a value is to be assumed for which the function $\overline{\Delta\phi}(l)$ increases monotonically.

6. The process according to claim 1, wherein the parameters of the straight regression line are estimated using a least squares approximation.

7. The process according to claim 1, wherein, the determination of the coefficients for the filtering utilizes correlation between the Doppler frequency and the phase difference of the source data as between $\vec{X}_{left}$ and $\vec{X}_{right}$.

* * * * *